United States Patent
Clasen et al.

(10) Patent No.: US 10,395,642 B1
(45) Date of Patent: Aug. 27, 2019

(54) CAPTION DATA FISHING

(71) Applicant: Cox Communications, Inc., Atlanta, GA (US)

(72) Inventors: Daniel Clasen, Fayetteville, GA (US); Lior Koren, Sudbury, MA (US); Franco Morales, Woodstock, GA (US); Carson Banov, Vero Beach, FL (US); Shubh Singhi, Johns Creek, GA (US); Joshua Edward Fierstein, Clearwater, FL (US); Douglas David Gravino, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 155 days.

(21) Appl. No.: 13/681,305

(22) Filed: Nov. 19, 2012

(51) Int. Cl.
*G10L 21/00* (2013.01)
*G10L 15/02* (2006.01)

(52) U.S. Cl.
CPC .................... *G10L 15/02* (2013.01)

(58) Field of Classification Search
CPC ...................................................... G10L 21/00
USPC ........ 704/270, 243, 235; 725/58, 53, 46, 34, 725/32, 28; 707/769, 722
See application file for complete search history.

(56) References Cited

U.S. PATENT DOCUMENTS

| | | | | |
|---|---|---|---|---|
| 6,243,676 B1 * | 6/2001 | Witteman | ............... | G06F 16/40 704/243 |
| 6,370,543 B2 * | 4/2002 | Hoffert | ................... | G06F 16/40 725/113 |
| 6,442,518 B1 * | 8/2002 | Van Thong | ............. | G10L 15/26 704/235 |
| 8,195,650 B2 * | 6/2012 | Sheshagiri | ............ | G06F 16/907 707/722 |
| 8,566,880 B2 * | 10/2013 | Dunker | ................ | G11B 27/034 725/53 |
| 8,813,112 B1 * | 8/2014 | Cibula | .................... | H04W 4/14 725/24 |
| 2002/0147984 A1 * | 10/2002 | Tomsen | ............... | H04N 5/4401 725/109 |
| 2003/0023972 A1 * | 1/2003 | Gutta | ..................... | H04N 7/163 725/34 |
| 2003/0097657 A1 * | 5/2003 | Zhou | ...................... | H04N 7/163 725/46 |
| 2005/0132420 A1 * | 6/2005 | Howard | .................. | G06F 3/017 725/135 |
| 2006/0064734 A1 * | 3/2006 | Ma | ...................... | H04N 5/44582 725/136 |
| 2006/0212897 A1 * | 9/2006 | Li | .......................... | H04H 60/58 725/32 |
| 2007/0050389 A1 * | 3/2007 | Kim | ...................... | G06Q 30/02 |

(Continued)

OTHER PUBLICATIONS

Michael J. Welch, et al., Generating Advertising Keywords from Video Content, UCLA Computer Science Department Technical Report #100025, 2010.

*Primary Examiner* — Michael C Colucci
(74) *Attorney, Agent, or Firm* — Merchant & Gould P.C.

(57) ABSTRACT

Identification of keywords from media content metadata including caption data is provided. When a piece of media content is received by a user, media content metadata and caption data may be provided to a data mining engine operable to identify and tag keywords. Identified keyword data may be provided to one or more native or third party applications for providing information to the user relevant to what he is watching.

20 Claims, 11 Drawing Sheets

(56) References Cited

U.S. PATENT DOCUMENTS

| | | | |
|---|---|---|---|
| 2007/0088852 A1* | 4/2007 | Levkovitz | H04L 12/1859 709/246 |
| 2007/0300261 A1* | 12/2007 | Barton | G06Q 30/0241 725/58 |
| 2008/0199150 A1* | 8/2008 | Candelore | H04N 7/163 386/241 |
| 2008/0204595 A1* | 8/2008 | Rathod | H04N 21/4348 348/465 |
| 2008/0243756 A1* | 10/2008 | Moon | G06Q 30/02 |
| 2008/0249986 A1* | 10/2008 | Clarke-Martin | G06Q 30/02 |
| 2009/0319365 A1* | 12/2009 | Waggoner | G06Q 30/02 705/14.41 |
| 2010/0138292 A1* | 6/2010 | Park | G06Q 30/02 705/14.46 |
| 2010/0306249 A1* | 12/2010 | Hill | G06Q 30/02 707/769 |
| 2011/0093882 A1* | 4/2011 | Candelore | H04N 7/163 725/28 |
| 2011/0154224 A1* | 6/2011 | Bates | G06Q 10/10 715/758 |
| 2011/0238495 A1* | 9/2011 | Kang | G06Q 30/02 705/14.49 |
| 2011/0283311 A1* | 11/2011 | Luong | H04N 21/414 725/28 |
| 2012/0030018 A1* | 2/2012 | Passmore | G06Q 30/02 705/14.52 |
| 2013/0061260 A1* | 3/2013 | Maskatia | G07F 17/005 725/28 |
| 2014/0137188 A1* | 5/2014 | Bartholomay | G06Q 30/0251 726/3 |

* cited by examiner

FIG. 4

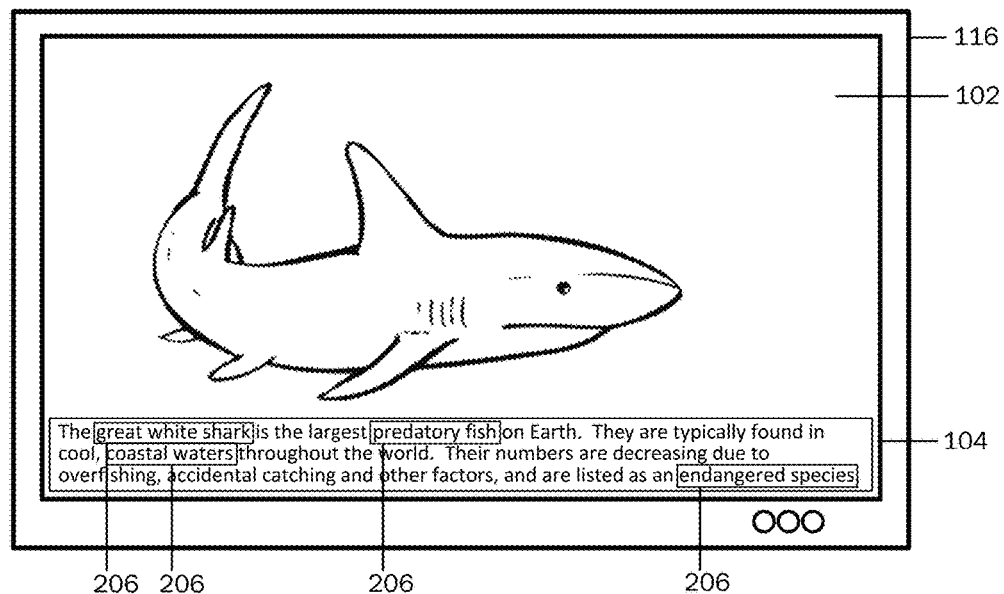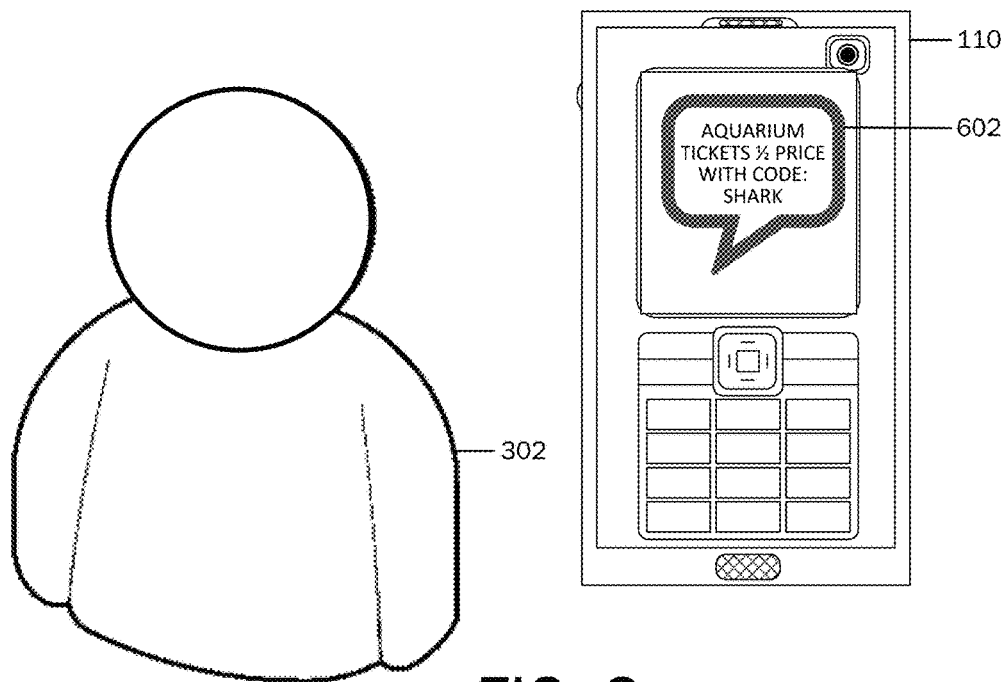
FIG. 6

CAPTION DATA FISHING

BACKGROUND

Caption data may be provided in the form of metadata with various types of media content including, but not limited to, linear programming, video on demand (VOD), video content available through a network from Internet content sources, advertisements within linear programming, VOD content, video content available through a network from Internet content sources or other content sources, etc. Many channels require for caption data to be provided with television programs and commercials. Currently, caption data may be utilized in noisy environments or for allowing persons with hearing disabilities to have access to television programming by displaying an audio portion of a television program as text on the television screen. In addition to providing a display of a transcript of media content, captioning may be a source of text for keyword recognition.

It is with respect to these and other considerations that the present invention has been made.

SUMMARY

Embodiments of the present invention provide for using caption data to provide information to a user relevant to data he is watching. Metadata including caption data may be provided to a data mining engine operable to identify and tag keywords. The keyword data may be provided to one or more native and/or third party applications for providing information to the user relevant to what he is watching.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout:

FIG. 4 is an illustration of a television program displayed on a television and a web-based collaborative encyclopedia application provided and displayed in other portions of the display;

FIG. 6 is an illustration of an advertisement provided to a mobile communication device relevant to media content being watched by a user according to caption data;

DETAILED DESCRIPTION

Figure 1:
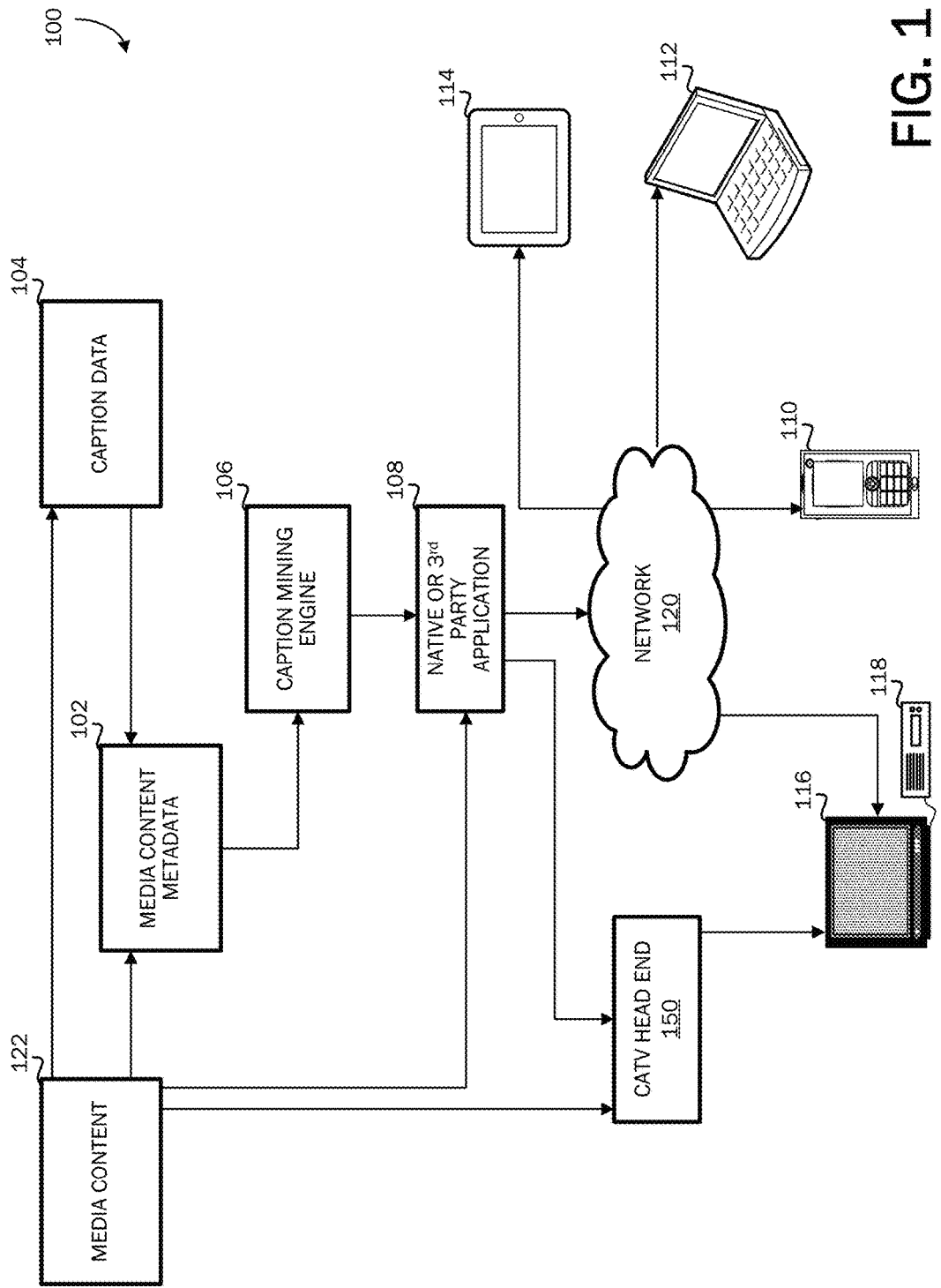
FIG. 1 is a diagram of an exemplary system that provides information according to keywords identified and mined from caption data according to an embodiment.
Figure 2:
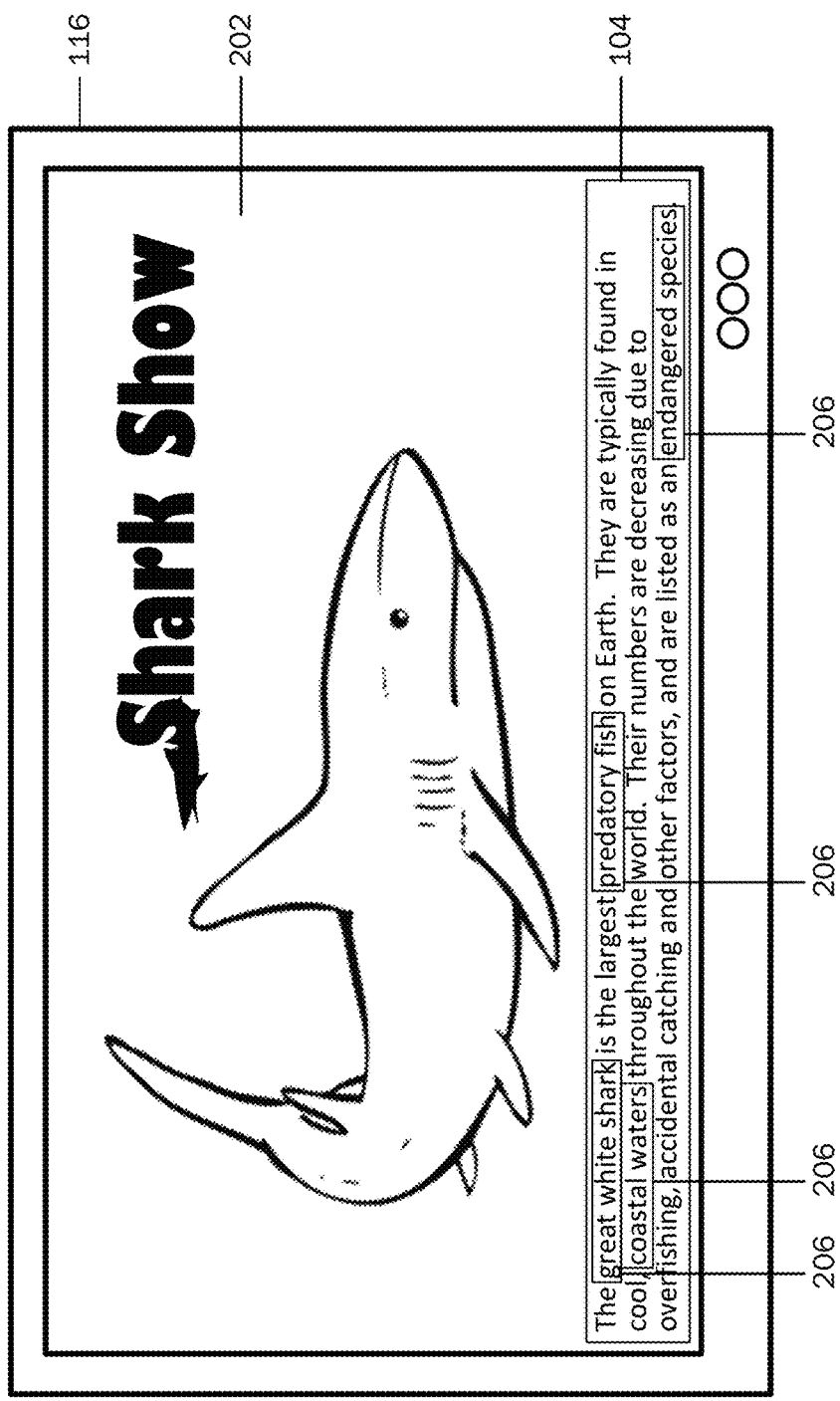
FIG. 2 is an illustration of an example of media content comprising caption data displayed on an endpoint device.

Embodiments of the present invention are directed to providing an identification of keywords from media content metadata including caption data. Media content metadata and caption data associated with a media content item (e.g., linear programming, video on demand (VOD), video content available through a network from Internet content sources, advertisements, etc.) may be provided to a data mining engine operable to identify and tag keywords. Identified keyword data may be provided to one or more native and/or third party applications for providing information to a user relevant to what he is watching.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating a system 100 for providing caption data for providing information related to media programming content. Referring now to FIG. 1, the system 100 may comprise a caption mining engine 106. According to embodiments, the caption mining engine 106 may receive media content metadata 102 associated with media content 122. Media content 122 may include various types of content provided by a plurality of content providers. For example, media content 122 may include, but is not limited to, linear programming, video on demand (VOD), video content available through a network 120 from Internet content sources, advertisements, etc. The media content metadata 102 may include information descriptive of the media content 122 that may be utilized to provide search engine visibility, discovery, content personalization, and potential for revenue streams through product placements and targeted advertising. For example, media content metadata 102 may include such information as content title, storyline, cast, genre, release date, images, etc.

According to embodiments and as shown in FIG. 1, media content metadata 102 may comprise caption data 104. Caption data 104 may include a transcription of an audio portion of media content 122 and may include a transcription of on-screen text. Caption data 104 may or may not be displayed on a display of a viewing device (e.g., television 116). Caption data 104 may also include time codes indicating a time and duration of spoken elements. Caption data 104 may be embedded in media content 122, which may be decoded. Media content 122 may be captioned in real-time, such as a live broadcast of a special event or a news program. Alternatively, caption data 104 may be included with media content 122 when it is produced, may be added to media content 122 post-production via a captioning application, or may be provided separately from media content 122. As can be appreciated, because caption data 104 comprises a transcription of the audio portion of media content 122 and may also include a transcription of displayed on-screen text, a large pool of keywords and search terms may be provided.

As illustrated in FIG. 1, media content metadata 102 including caption data 104 may be received by a caption mining engine 106. According to embodiments, the caption mining engine 106 may be operable to mine the metadata 102 and identify and tag keywords. The caption mining engine 106 may utilize natural language processing in conjunction with metadata to determine a topic and to discover and tag keywords. Processing may include identifying and tagging elements to extract meaningful text. For example, if a football game is being broadcasted, caption data 104 may include the commentary and announcements of the game being played. The caption mining engine 106 in this example may be operable to mine the media content metadata 102 including the caption data 104 and make a determination of a topic (e.g., football game) and various keywords (e.g., the teams playing, players' and coaches' names, stadium name, names of defense and offense formations, sponsors, etc.).

The meaningful text gleaned by the caption mining engine 106 may be used for a variety of business practices or interactivity. According to embodiments, the meaningful text may be synchronized with one or more native and/or third party applications 108. Native and third party applications 108 may include various types of applications and/or widgets and may include interactive applications.

Figure 3:
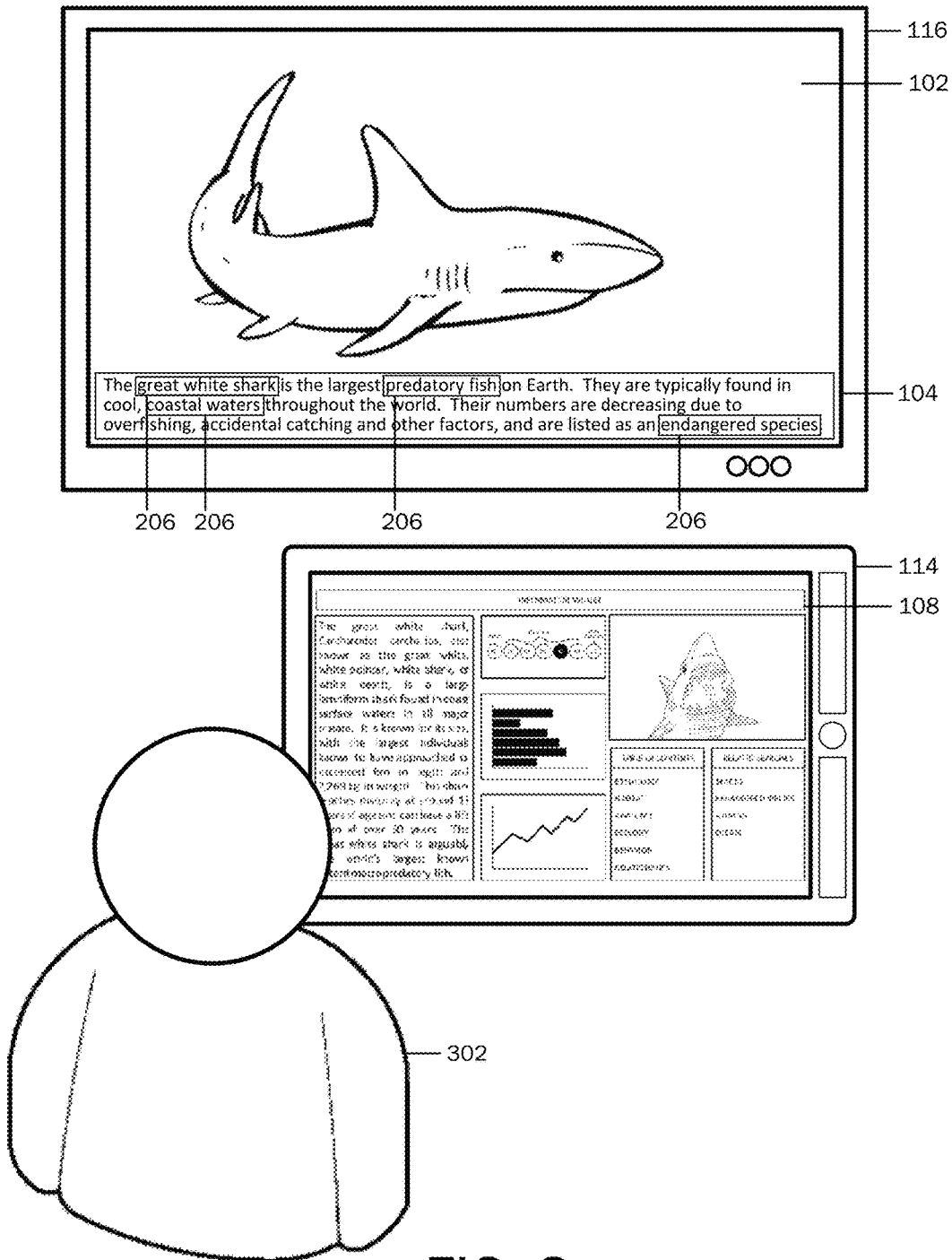
FIG. 3 is an illustration of a television program displayed on a television and a web-based collaborative encyclopedia application provided and displayed on a tablet computing device.

For example and with reference to FIGS. 2-5, a television program 202 about sharks may be delivered via a service provided, such as a cable television (CATV) services system, to an endpoint device 110, 112, 114, 116, 118, such as a set top box 118 connected to a television 116. Media content metadata 102 including caption data 104 may be received by a caption mining engine 106. Meaningful text including a topic of the television program 202 as well as a collection of keywords 206 may be determined by the caption mining engine 106. According to this example, from a portion of the program 202, the topic may be determined to be "sharks," and discovered keywords 206 may include words such as, "great white shark," "predatory fish," "coastal waters," and "endangered species." The meaningful text including topic and keyword 206 data may be provided to a native or third party application 108. The native or third party application 108 may be accessed via a variety of endpoint devices such as, but not limited to, a mobile communication device 110, a desktop or laptop computer 112, a tablet computing device 114 or other wireless device, an Internet television 116, or a television 116 connected to a networked device such as a set top box (STB) 118. As one example, the third party application 108 may include a web-based collaborative encyclopedia application (e.g., Wikipedia®). As a user 302 watches the television program 202 about sharks, the web-based collaborative encyclopedia application (third party application 108) may be provided and displayed on the user's tablet computing device 114 as illustrated in FIG. 3. According to this example, the web-based collaborative encyclopedia application (third party application 108) may provide information about great white sharks (i.e., keyword 206). The third party application 108 may receive meaningful data including topic and keyword 206 data as the television program 202 is being watched by the user 302 and may provide data relevant to the data provided in the program 202.

Figure 4:
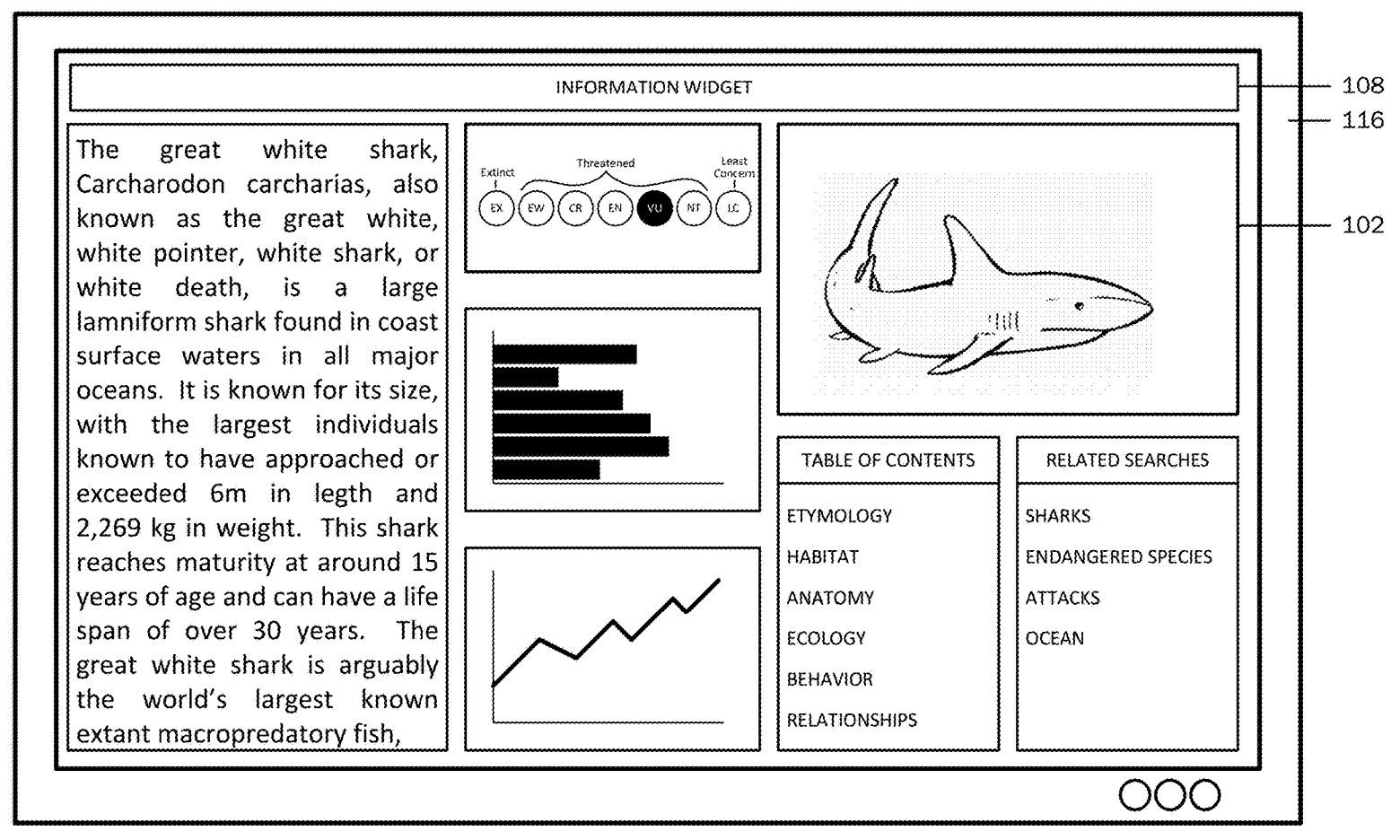

According to an embodiment, a native or third party application 108 may run on a same endpoint device (e.g., television 116) or on a network-connected device (e.g., STB 118) connected to the endpoint device on which the television program 202 is being displayed such that the display may include both the television program 202 and the native or third party application 108. As illustrated in FIG. 4, the television program 202 may be displayed in a window on the television 116 display and the third party application 108 (e.g., a web-based collaborative encyclopedia application) may display information in other portions of the display.

Figure 5:
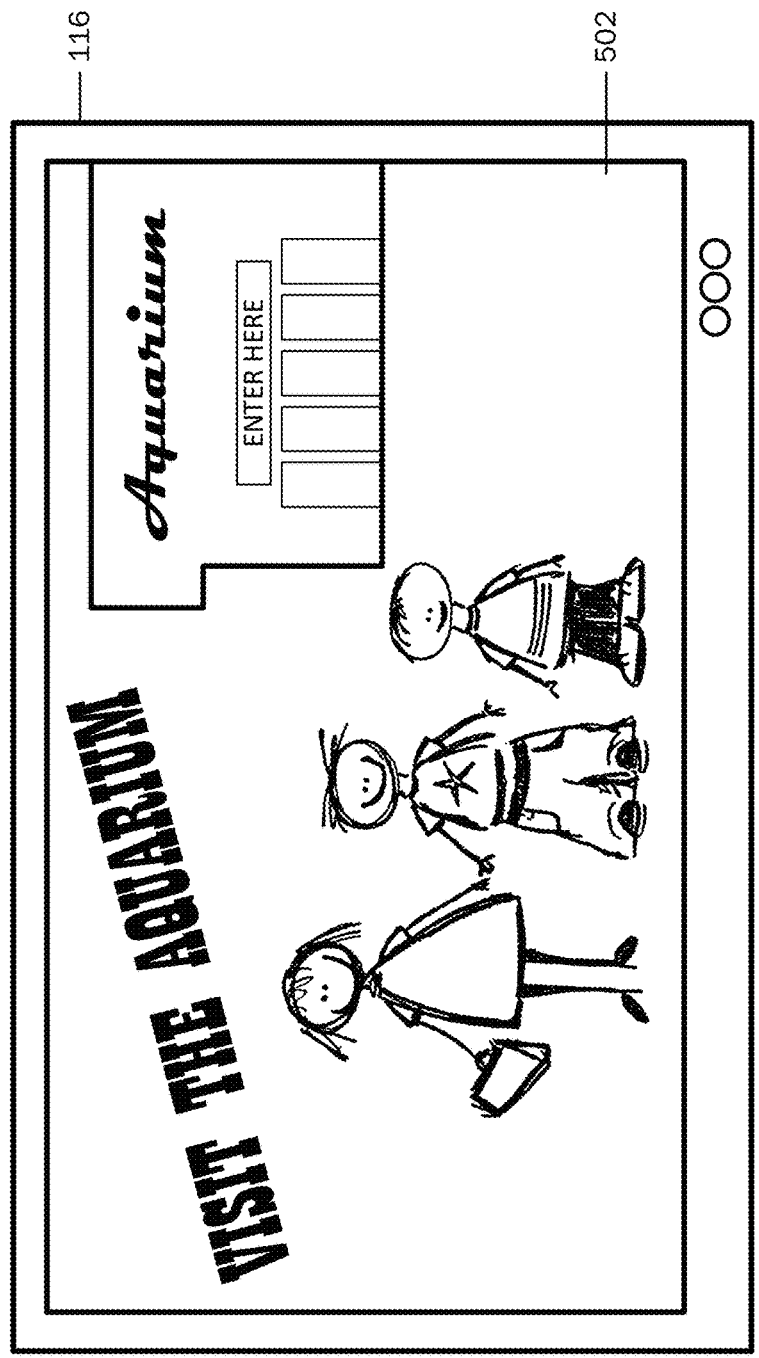
FIG. 5 is an illustration of an advertisement displayed on a television relevant to media content being watched by a user according to caption data.

The web-based collaborative encyclopedia application is just one example of many various types of third party applications 108 that may receive information gleaned by the caption mining engine 106 from media content metadata 102 and caption data 104. As another example and as illustrated in FIG. 5, a native or third party application 108 may use the information gleaned by the caption mining engine 106 for providing advertisements 502 relevant to media content 122 being watched by a user 302. In the example illustrated in FIG. 5, a determination may be made that, according to information gleaned by the caption mining engine 106, a television program 202 being watched by the user 302 is about sharks. Accordingly, a television advertisement 502 related to the shark television program 202 being watched in the examples illustrated in FIGS. 2-4 may be displayed. In this example, an advertisement 502 about an aquarium is provided.

Advertisements 502 may be provided via other endpoint devices or by other means. As one example and as illustrated in FIG. 6, a short message service (SMS) text message 602 of an advertisement 502 may be provided to a user's 302 mobile communication device 110 (e.g., cell phone). In the example illustrated, the advertisement 502 contains a coupon code that the user 302 can use to receive a discount on the product or service advertised. Used coupon codes may be utilized by advertisers to track effectiveness of a mode of advertising. As can be appreciated, a native or third party application 108 may provide advertising by many various modes including, but not limited to, postal mail, product and service samples, emails, free applications, downloads, etc.

Figure 7:
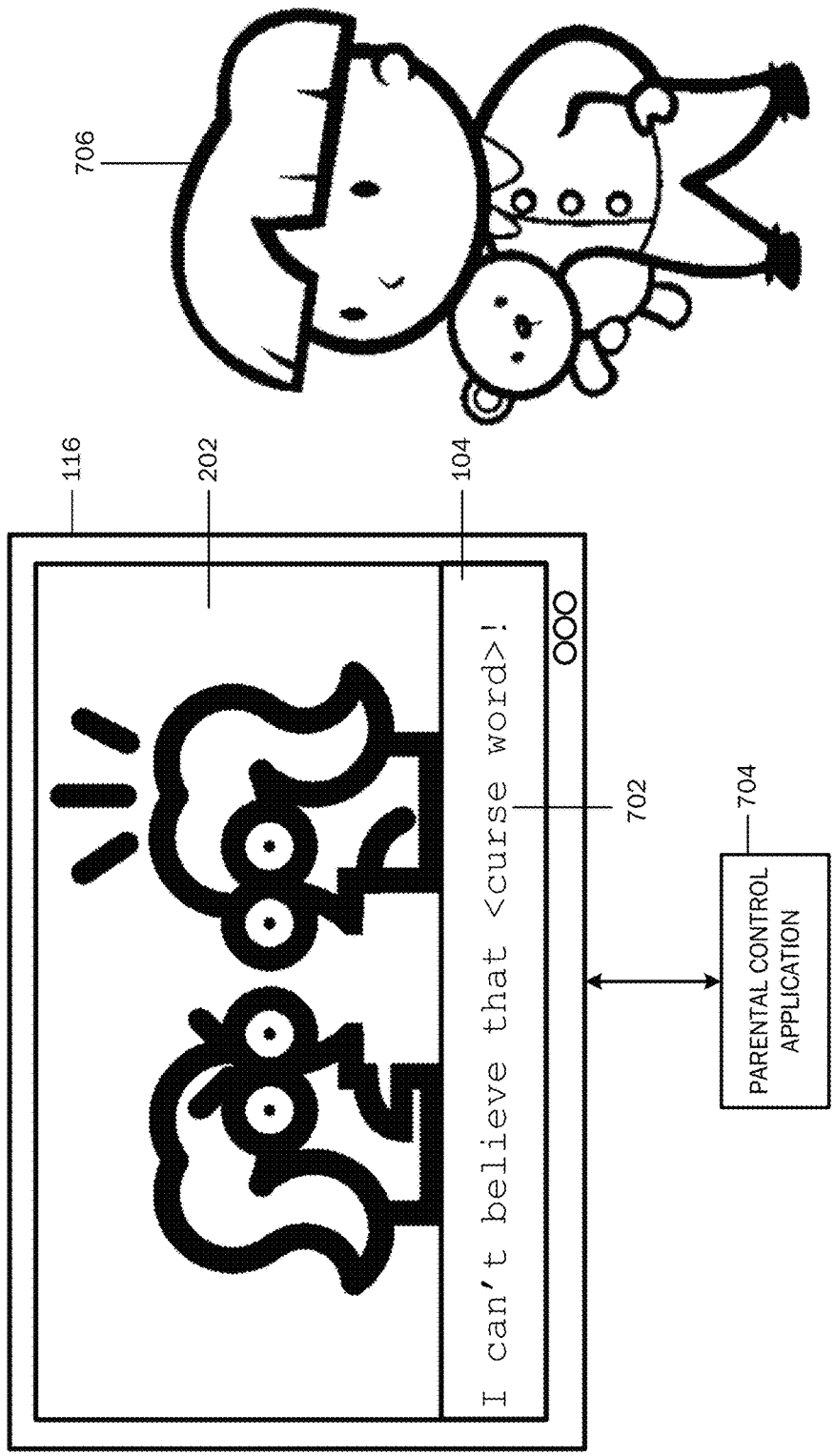
FIG. 7 is an illustration of a parental control application utilizing keywords provided via a caption mining engine.

According to an embodiment, a native or third party application 108 may include a parental control application 704 as illustrated in FIG. 7. In this use case, the caption mining engine 106 may be operable to analyze media content metadata 102 including caption data 104 for discovering certain keywords 206, for example, curse words 702. A user 302 may include a parent. The user 302 or parent may select certain keywords 206, which may include curse words 702, via the parental control application 704 to censor. For example, a parent may want to censor certain curse words 702 so that a child 706 watching a television program 202 may not be able to listen to the curse words 702. The caption mining engine 106 may provide information to the parental control application 704 including time codes so that when a detected curse word 702 is spoken in the television program 202, the application 704 may provide censoring (e.g., a beep over the spoken word).

A native or third party application 108 may include an application for providing a count of a number of times a keyword 502 is spoken in a program 202 or advertisement 502. For example, a keyword 502 count may be provided to an advertiser, such as a sponsor of a televised sporting event, to ensure a number of product placements is included in the program 202.

A native or third party application 108 may include an application for determining when a user 302 may stop watching a program 202 and for determining certain keywords 502 that may cause users 302 to change the channel. As an example, a native or third party application 108 may determine that on a certain channel, for example a cooking channel, a portion of users 302 change the channel after a keyword 502 such as a host's name is announced. The application 108 may be used by content providers as a method of a survey to determine what users 302 may like or dislike about a program 202. As can be appreciated, these are but a few of many types of native or third party applications 108 that may use information provided by a caption mining engine 106.

Figure 8:
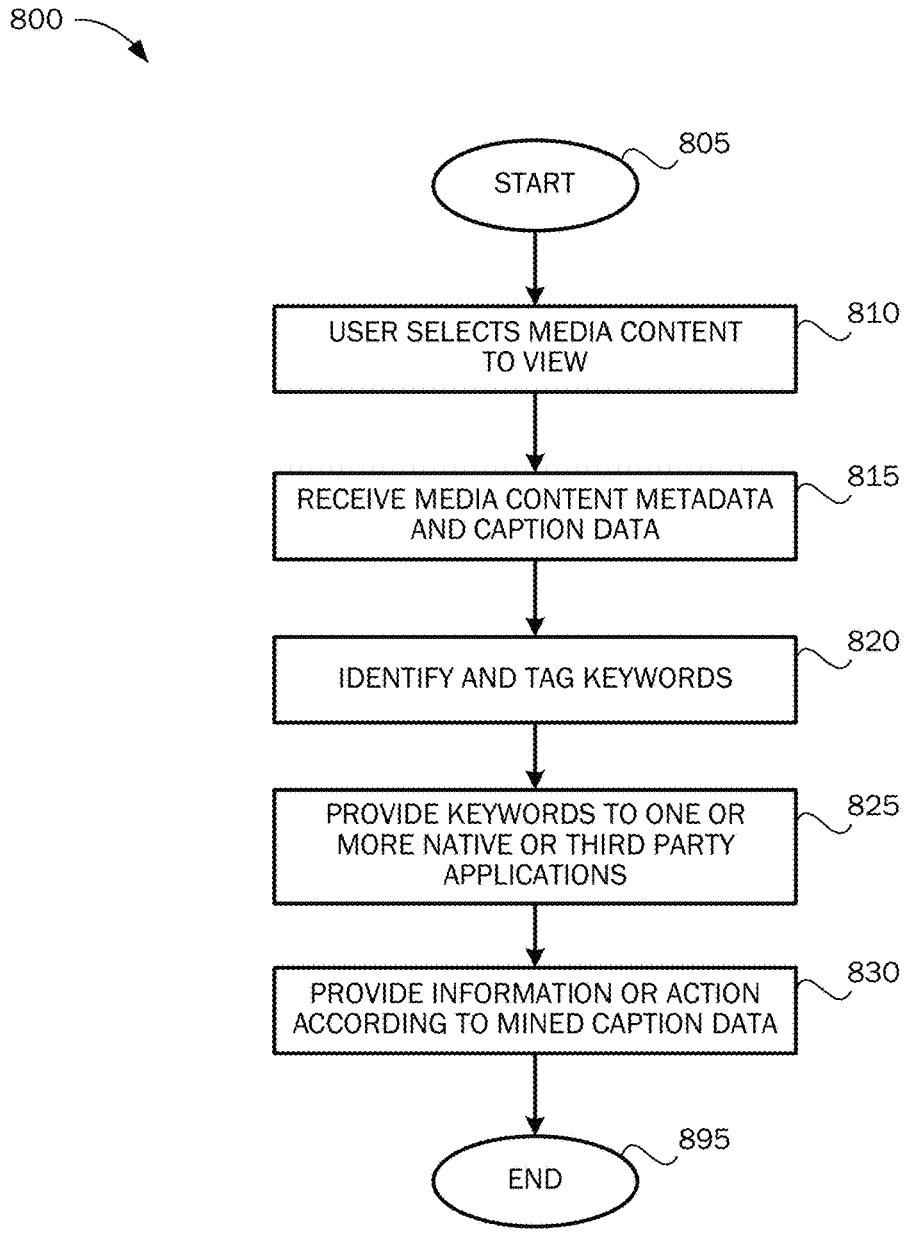
FIG. 8 is a flow chart of a method for providing information according to keywords identified and mined from caption data according to an embodiment.

Having described a system architecture 100 and various examples of uses of information provided by a caption mining engine 106, FIG. 8 is a flow chart of a method 800 for providing information or an action according to mined caption data 104 according to an embodiment. The method 800 starts at OPERATION 805 and proceeds to OPERATION 810 where a user 302 may select a piece of media content 122 to view. The media content 122 may include, but is not limited to, linear programming, video on demand (VOD), video content available through a network 120 from Internet content sources, advertisements, etc.

At OPERATION 815, media content metadata 102 including caption data 104 is received by the data mining engine 106. As described above, media content metadata 102 may include information descriptive of media content 122. The media content metadata 102 may include such information as content title, storyline, cast, genre, release date, images, etc. The media content metadata 102 may also include caption data 104. Caption data 104 may include a transcription of an audio portion of media content 122 and may include a transcription of on-screen text.

At OPERATION 820, the caption mining engine 106 may mine the metadata 102 and identify and tag keywords 206. The caption mining engine 106 may utilize natural language processing in conjunction with metadata to identify and tag elements to extract meaningful text.

The method 800 proceeds to OPERATION 825 where identified keywords 206 extracted from the media content metadata 102 and caption data 104 may be provided to one or more native and/or third party applications 108. As described above, the one or more native and/or third party applications 108 may include various types of applications that may be provided to a variety of endpoint devices 110, 112, 114, 116, 118. For example, a native or third party application 108 may include, but is not limited to, a web-based collaborative encyclopedia application, an advertisement application, a parental control application, etc.

At OPERATION 830, information or an action according to the mined keywords 206 may be provided to a user 302. For example, if a third party application 108 receiving keywords 206 extracted from media content metadata 102 and caption data 104 is a web-based collaborative encyclopedia application, the information or action provided to the user 302 may include an information about an extracted keyword 206 provided to the user's television 116, mobile phone 110 or other tablet device 114. Caption data 104 may include time code data. Information or an action may be provided to the user 302 by the native or third party application 108 relevant to timing of keywords 206 being provided during play of the media content 122. The method 800 ends at OPERATION 895.

Figure 9:
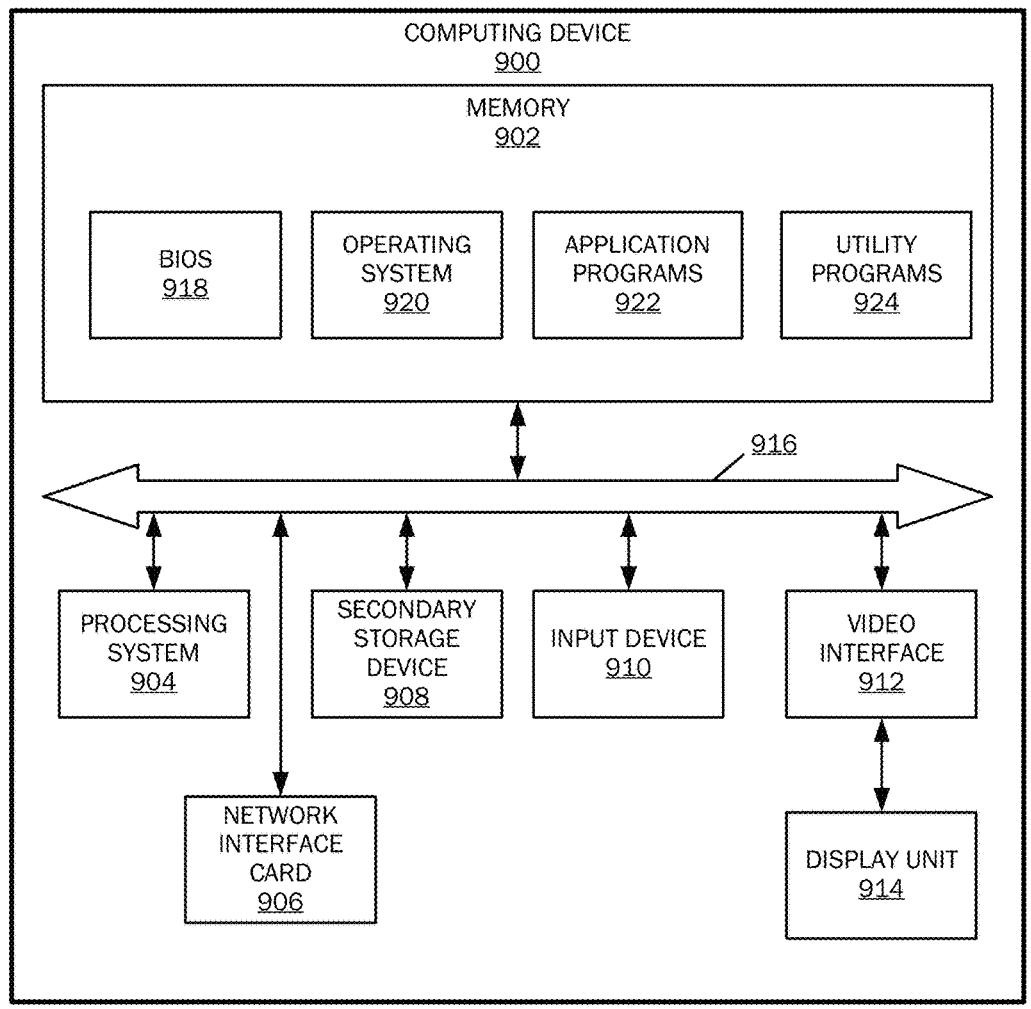
FIG. 9 is a block diagram illustrating example physical components of a computing device with which embodiments may be practiced.

FIG. 9 is a block diagram illustrating example physical components of a computing device 900 with which embodiments may be practiced. In some embodiments, one or a combination of the components the data mining engine 106 or the one or more native or third party applications 108 may be implemented using one or more computing devices like the computing device 900. It should be appreciated that in other embodiments, the data mining engine 106 or the one or more native or third party applications 108 may be implemented using computing devices having hardware components other than those illustrated in the example of FIG. 9.

Computing devices may be implemented in different ways in different embodiments. For instance, in the example of FIG. 9, the computing device includes a processing system 904, memory 902, a network interface 506, a secondary storage device 508, an input device 910, a video interface 912, a display unit 914, and a communication medium 916. In other embodiments, the computing device 900 may be implemented using more or fewer hardware components (e.g., a video interface, a display unit, or an input device) or in combination with other types of computer systems and program modules.

The memory 902 includes one or more computer-readable storage media capable of storing data and/or computer-executable instructions. According to one embodiment, data mining engine 106 or the one or more native or third party applications 108 may be stored locally on computing device 900. Memory 902 thus may store the computer-executable instructions that, when executed by processor 904, cause the data mining engine 106 to mine metadata to identify keywords 206 or the one or more native or third party applications to receive identified keywords 206 and provide information or an action associated with the received keywords to a user as described above with reference to FIGS. 1-8.

In various embodiments, the memory 902 is implemented in various ways. For example, the memory 902 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 904 includes one or more processing units, which may include tangible integrated circuits that selectively execute computer-executable instructions. In various embodiments, the processing units in the processing system 904 are implemented in various ways. For example, the processing units in the processing system 904 can be implemented as one or more processing cores. In this example, the processing system 904 can comprise one or more Intel Core microprocessors. In another example, the processing system 904 can comprise one or more separate microprocessors. In yet another example embodiment, the processing system 904 can comprise Application-Specific Integrated Circuits (ASICs) that provide specific functionality. In yet another example, the processing system 904 provides specific functionality by using an ASIC and by executing computer-executable instructions.

The computing device 900 may be enabled to send data to and receive data from a communication network via a network interface card 906. In different embodiments, the network interface card 906 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 908 includes one or more computer-readable storage media, and may store data and computer-executable instructions not directly accessible by the processing system 904. That is, the processing system 904 performs an I/O operation to retrieve data and/or computer-executable instructions from the secondary storage device 908. In various embodiments, the secondary storage device 908 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 910 enables the computing device 900 to receive input from a user. Example types of input devices include, but are not limited to, keyboards, mice, trackballs, stylus input devices, key pads, microphones, joysticks, touch-sensitive display screens, and other types of devices that provide user input to the computing device 900.

The video interface 912 outputs video information to the display unit 914. In different embodiments, the video interface 912 is implemented in different ways. For example, the video interface 912 is a video expansion card. In another example, the video interface 912 is integrated into a motherboard of the computing device 900. In various embodiments, the display unit 914 can be a an LCD display panel, a touch-sensitive display panel, an LED screen, a projector, a cathode-ray tube display, or another type of display unit. In various embodiments, the video interface 912 communicates with the display unit 914 in various ways. For example, the video interface 912 can communicate with the display unit 914 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 916 facilitates communication among the hardware components of the computing device 900. In different embodiments, the communications medium 916 facilitates communication among different components of the computing device 900. For instance, in the example of FIG. 9, the communications medium 916 facilitates communication among the memory 902, the processing system 904, the network interface card 906, the secondary storage device 908, the input device 910, and the video interface 912. In different embodiments, the communications medium 916 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918, and an operating system 920. The BIOS 918 includes a set of software instructions that, when executed by the processing system 904, cause the computing device 900 to boot up. The operating system 920 includes a set of software instructions that, when executed by the processing system 904, cause the computing device 900 to provide an operating system that coordinates the activities and sharing of resources of the computing device 900. The memory 902 also stores one or more application programs 922 that, when executed by the processing system 904, cause the computing device 900 to provide applications to users, for example, the caption mining engine 106 and/or one or more native or third party applications 108. The memory 902 also stores one or more utility programs 924 that, when executed by the processing system 904, cause the computing device 900 to provide utilities to other software programs. Embodiments of the present invention may be utilized in various distributed computing environments where tasks are performed by remote processing devices that are linked through a communications network in a distributed computing environment.

Figure 10:
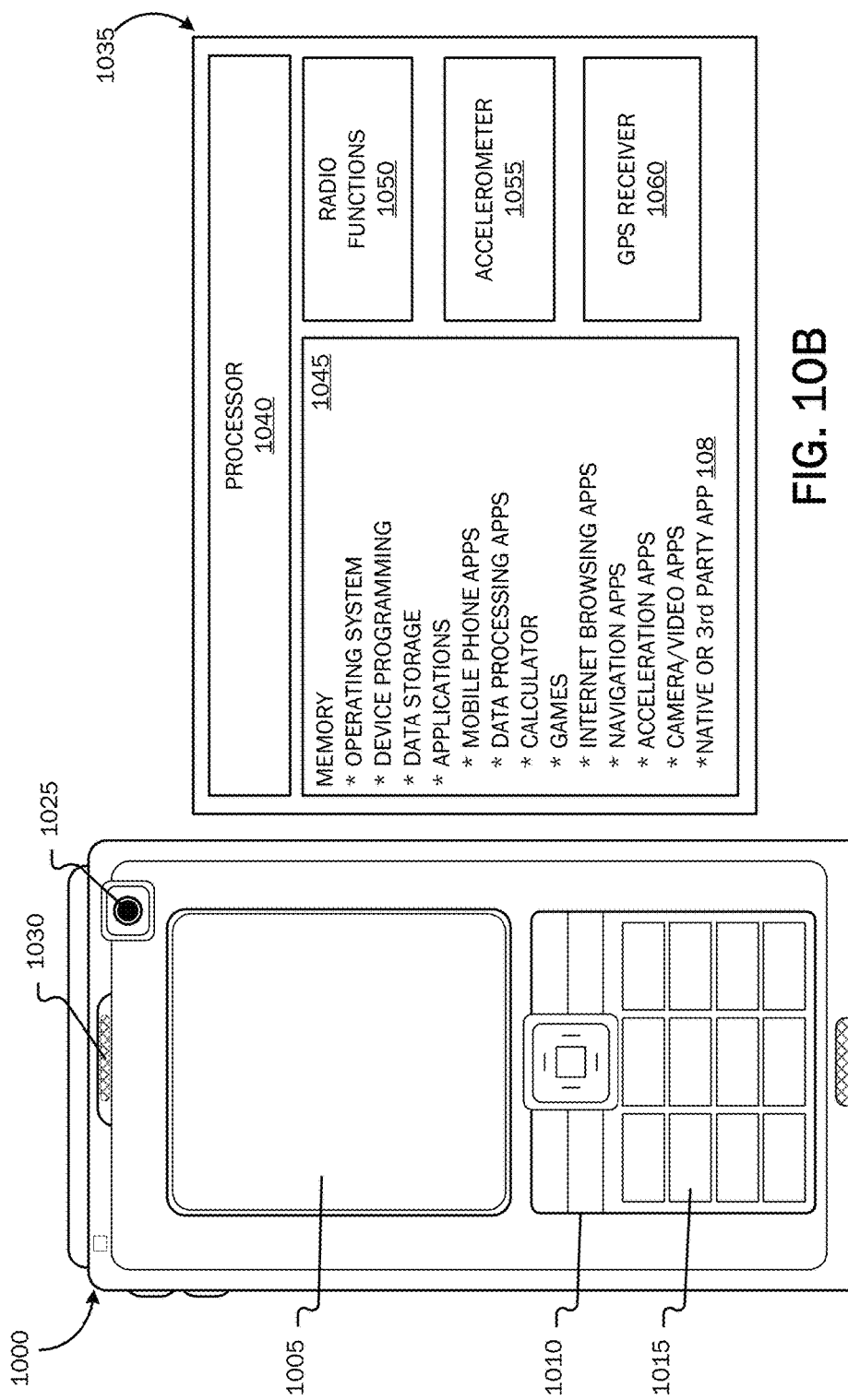
FIGS. 10A-10B illustrate a suitable mobile computing environment with which embodiments may be practiced.

FIGS. 10A-10B illustrate a suitable mobile computing environment, for example, a mobile computing device 1000, a smart phone, a tablet personal computer, a laptop computer, and the like, with which embodiments may be practiced. The mobile computing device 1000 is illustrative of any suitable device operative to send, receive and process wireless communications according to embodiments of the present invention. A display screen 1005 is operative for displaying a variety of information such as information about incoming and outgoing communications, as well as, a variety of data and displayable objects, for example, text, alphanumeric data, photographs, and the like.

Data input to the device 1000 may be performed via a variety of suitable means, such as, touch screen input via the display screen 1005, keyboard or keypad input via a data entry area 1010, key input via one or more selectable buttons or controls 1015, voice input via a microphone 1018 disposed on the device 1000, photographic input via a camera 1025 functionality associated with the mobile computing device, or any other suitable input means. Data may be output via the device 1000 via any suitable output means, including but not limited to, display on the display screen 1005, audible output via an associated speaker 1030 or connected earphone system, vibration module for providing tactile output, and the like.

Referring now to FIG. 10B, operational unit 1035 is illustrative of internal operating functionality of the mobile computing device 1000. A processor 1040 is illustrative of a general purpose computer processor for processing incoming and outgoing data and communications and controlling operation of the device and associated software applications via a mobile computing device operating system. Memory 1045 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the data mining engine 106 and/or one or more native or third party applications 108 may be stored locally on mobile computing device 1000.

Mobile computing device 1000 may contain an accelerometer 1055 for detecting acceleration, and can be used to sense orientation, vibration, and/or shock. Mobile computing device 1000 may contain a global positioning system (GPS) system (e.g., GPS send/receive functionality) 1060. A GPS system 1060 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1050 include all required functionality, including onboard antennae, for allowing the device 1000 to communicate with other communication devices and systems via a wireless network. Radio functions 1050 may be utilized to communicate with a wireless or WIFI-based positioning system to determine a device's 1000 location.

Figure 11:
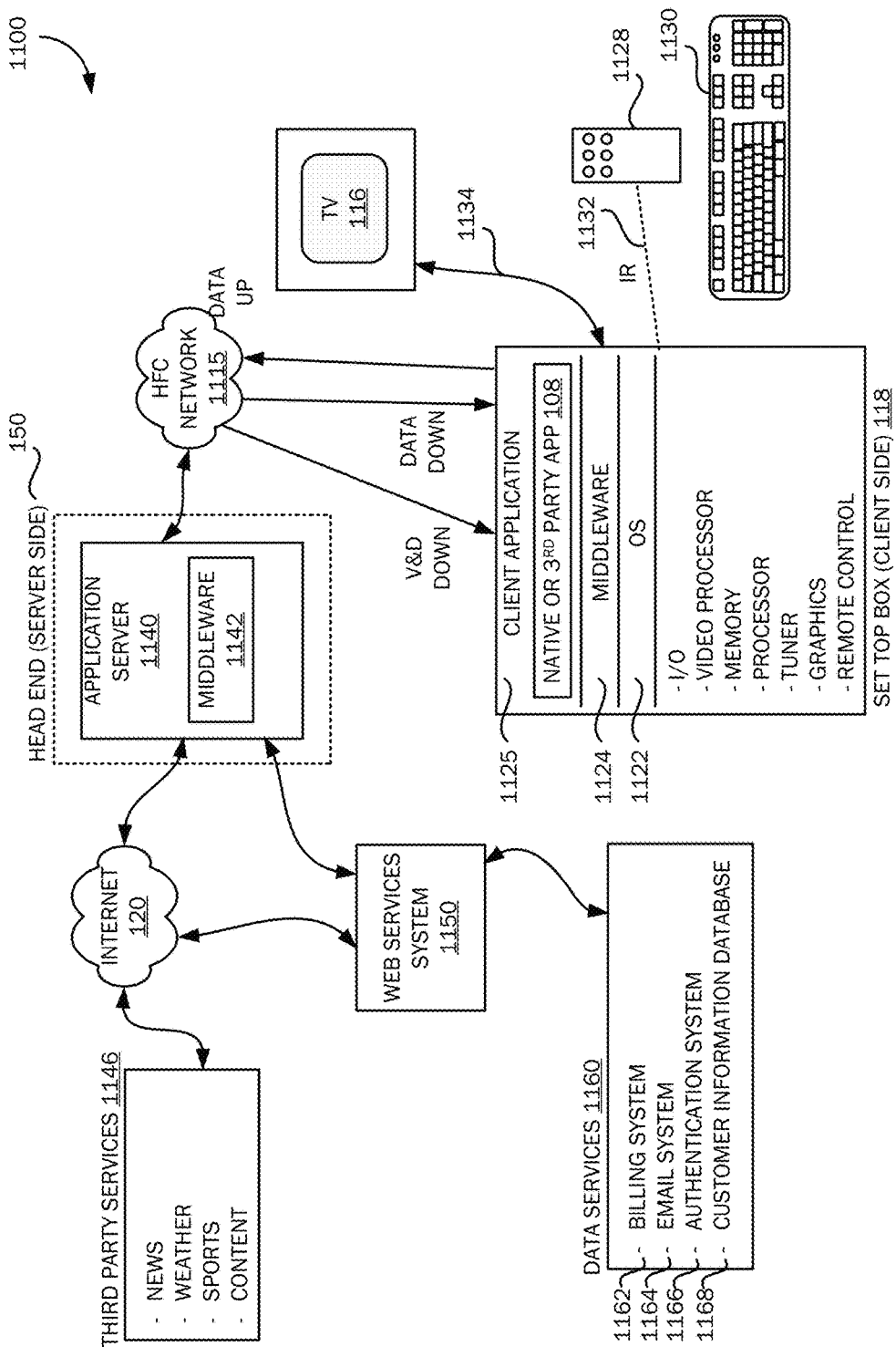
FIG. 11 is a simplified block diagram illustrating a cable television/services system architecture providing an operating environment according to an embodiment.

FIG. 11 is a simplified block diagram illustrating a cable television services system 1100 (hereafter referred to as "CATV") architecture providing an operating environment according to an embodiment. As can be appreciated, a CATV architecture is but one of various types of systems that may be utilized to provide information according to mined caption data 104. Referring now to FIG. 11, digital and analog video programming, information content and interactive television services are provided via a hybrid fiber coax (HFC) network 1115 to a television set 116 for consumption by a cable television/services system customer. As is known to those skilled in the art, HFC networks 1115 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 1115 allows for efficient bidirectional data flow between the client-side set-top box 118 and a server-side application server 1140.

The CATV system 1100 is in the form of a distributed client-server computing system for providing video and data flow across the HFC network 1115 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 1100 may provide a variety of services across the HFC network 1115 including traditional digital and analog video programming, telephone services, high speed Internet access, video-on-demand, and information services.

On the client side of the CATV system 1100, digital and analog video programming and digital and analog data are provided to the customer television set 116 via the set-top box (STB) 118. Interactive television services that allow a customer to input data to the CATV system 1100 likewise are provided by the STB 118. As illustrated in FIG. 11, the STB 118 is a multipurpose computing device having a computer processor, memory, and an input/output mechanism. The input/output mechanism receives input from server-side processes via the HFC network 1115 and from customers via input devices such as the remote control device 1128, keyboard 1130, or other computing device, such as a tablet/slate computer 114, smart phone 110, etc. The remote control device 1128 and the keyboard 1130 may communicate with the STB 118 via a suitable communication transport such as the infrared connection 1132. The STB 118 also includes a video processor for processing and providing digital and analog video signaling to the television set 116 via a cable communication transport 1134. A multi-channel tuner is provided for processing video and data to and from the STB 118 and the server-side head end system 150, described below.

The STB 118 also includes an operating system 1122 for directing the functions of the STB 118 in conjunction with a variety of client applications 1125. For example, if a client application 1125 requires a news flash from a third-party news source to be displayed on the television 116, the operating system 1122 may cause the graphics functionality and video processor of the STB 118, for example, to output the news flash to the television 116 at the direction of the client application 1125 responsible for displaying news items. According to embodiments, the operating system 1122 may include the data mining engine 106 or one or more native or third party applications 108 as described herein.

Because a variety of different operating systems 1122 may be utilized by a variety of different brands and types of set-top boxes, a middleware layer 1124 may be provided to allow a given software application to be executed by a variety of different operating systems. According to an embodiment, the middleware layer 1124 may include a set of application programming interfaces (APIs) that are exposed to client applications 1125 and operating systems 1122 that allow the client applications to communicate with the operating systems through common data calls understood via the API set. As described below, a corresponding middleware layer is included on the server side of the CATV system 1100 for facilitating communication between the server-side application server and the client-side STB 118. The middleware layer 1142 of the server-side application server and the middleware layer 1124 of the client-side STB 118 may format data passed between the client side and server side according to the Extensible Markup Language (XML).

According to one embodiment, the set-top box 118 passes digital and analog video and data signaling to the television 116 via a one-way communication transport 1134. According to other embodiments, two-way communication transports may be utilized, for example, via high definition multimedia (HDMI) ports. The STB 118 may receive video and data from the server side of the CATV system 1100 via the HFC network 1115 through a video/data downlink and data via a data downlink. The STB 118 may transmit data from the client side of the CATV system 1100 to the server side of the CATV system 1100 via the HFC network 1115 via one data uplink. The video/data downlink is an "in band" downlink that allows for digital and analog video and data signaling from the server side of the CATV system 1100 through the HFC network 1115 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 11, between the HFC network 1115 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 1140 is typically passed through the "out of band" data links. Alternatively, an "in band" data carousel may be positioned in an "in band" channel into which a data feed may be processed from the server-side application server 1140 through the HFC network 1115 to the client-side STB 118. Operation of data transport between components of the CATV system 1100, described with reference to FIG. 11, is well known to those skilled in the art.

Referring still to FIG. 11, the head end 150 of the CATV system 1100 is positioned on the server side of the CATV system and includes hardware and software systems responsible for originating and managing content for distributing through the HFC network 1115 to client-side STBs 118 for presentation to customers via televisions 116. As described above, a number of services may be provided by the CATV system 1100, including digital and analog video programming, interactive television services, telephone services, video-on-demand services, targeted advertising, and provision of information content.

The application server 1140 is a general-purpose computing system operative to assemble and manage data sent to and received from the client-side set-top box 118 via the HFC network 115. As described above with reference to the set-top box 118, the application server 1140 includes a middleware layer 1142 for processing and preparing data from the head end of the CATV system 1100 for receipt and use by the client-side set-top box 1118. For example, the application server 1140 via the middleware layer 1142 may obtain data from third-party services 1146 via the Internet 120 for transmitting to a customer through the HFC network 1115 and the set-top box 118. For example, content metadata a third-party content provider service may be downloaded by the application server via the Internet 120. When the application server 1140 receives the downloaded content metadata, the middleware layer 1142 may be utilized to format the content metadata for receipt and use by the set-top box 118. Therefore, content metadata may be sent and categorized based on the availability to the customer's program guide data.

According to one embodiment, data obtained and managed by the middleware layer 1142 of the application server 1140 is formatted according to the Extensible Markup Language and is passed to the set-top box 118 through the HFC network 1115 where the XML-formatted data may be utilized by a client application 1125 in concert with the middleware layer 1124, as described above. As should be appreciated by those skilled in the art, a variety of third-party services data, including news data, weather data, sports data and other information content may be obtained by the application server 1140 via distributed computing environments such as the Internet 120 for provision to customers via the HFC network 1115 and the set-top box 118.

According to embodiments, the application server 1140 obtains customer support services data, including billing data, information on customer work order status, answers to frequently asked questions, services provider contact information, and the like from data services 1160 for provision to the customer via an interactive television session. As illustrated in FIG. 11, the services provider data services 1160 include a number of services operated by the services provider of the CATV system 1100 which may include data on a given customer.

A billing system 1162 may include information such as a customer's name, street address, business identification number, Social Security number, credit history, and information regarding services and products subscribed to by the customer. According to embodiments, the billing system 1162 may also include billing data for services and products subscribed to by the customer for bill processing, billing presentment and payment receipt.

A customer information database 1168 may include general information about customers such as place of employment, business address, business telephone number, and demographic information such as age, gender, educational level, and the like. The customer information database 1168 may also include information on pending work orders for services or products ordered by the customer. The customer information database 1168 may also include general customer information such as answers to frequently asked customer questions and contact information for various service provider offices/departments. As should be understood, this information may be stored in a variety of disparate databases operated by the cable services provider.

Referring still to FIG. 11, web services system 1150 is illustrated between the application server 1140 and the data services 1160. According to embodiments, web services system 1150 serves as a collection point for data requested from each of the disparate data services systems comprising the data services 1160. According to embodiments, when the application server 1140 requires customer services data from one or more of the data services 1160, the application server 1140 passes a data query to the web services system 1150. The web services system formulates a data query to each of the available data services systems for obtaining any required data for a requesting customer as identified by a set-top box identification associated with the customer. The web services system 1150 serves as an abstraction layer between the various data services systems and the application server 1140. That is, the application server 1140 is not required to communicate with the disparate data services systems, nor is the application server 1140 required to understand the data structures or data types utilized by the disparate data services systems. The web services system 1150 is operative to communicate with each of the disparate data services systems for obtaining necessary customer data. The customer data obtained by the web services system is assembled and is returned to the application server 1140 for ultimate processing via the middleware layer 1142, as described above.

An authentication system 1166 may include information such as secure user names, subscriber profiles, subscriber IDs, and passwords utilized by customers for access to network services. As should be understood by those skilled in the art, the disparate systems 1162, 1164, 1166, 1168 may be integrated or provided in any combination of separate systems, wherein FIG. 11 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-11. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for extracting keywords from caption data, the method comprising:
   providing media content from a plurality of content providers to a user of an endpoint device;
   receiving media content metadata including caption data, associated with the media content, at a caption mining engine;
   mining the caption data associated with a portion of a program of the media content being displayed to determine a topic and identify keywords;
   synchronizing the topic and keyword data to one or more third party applications;
   while displaying the program on the endpoint device, providing and displaying on the same endpoint device the one or more third party applications;
   providing via the one or more third party applications on the endpoint device additional information relevant to the program being displayed on the same endpoint device based on the topic and the keywords identified by the caption mining engine from the caption data associated with the program being displayed on the same endpoint device; and
   displaying the additional information on the endpoint device, via the one or more displayed third party applications, simultaneously along with the program on the endpoint device such that the additional information and the program may be watched at the same time on the same endpoint device;
   wherein the caption data includes time code data that indicates a time and duration of spoken elements, and the additional information is provided to the user of the endpoint device by the one or more third party applications using the time code data based on a timing of the keywords being provided during playback of the media content.

2. The method of claim 1, wherein receiving media content metadata associated with media content comprises receiving media content metadata associated with one of:
   linear programming;
   video on demand (VOD) content;
   an advertisement; or
   video content available through a network from Internet content sources.

3. The method of claim 1, wherein receiving caption metadata associated with the media content comprises receiving a transcription of an audio portion of the media content.

4. The method of claim 1, wherein identifying one or more keywords comprises utilizing natural language processing to determine a topic and to discover and tag keywords.

5. The method of claim 1, wherein providing keyword data to one or more third party applications includes providing keyword data to one or more of:
   a web-based collaborative encyclopedia application;
   an advertisement application; or
   a parental control application.

6. A method for providing information based on extracted keywords from caption data, the method comprising:
   providing media content from a plurality of content providers to a user of an endpoint device;
   extracting from a caption mining engine a topic and keyword data from caption data associated with a media content item being displayed;
   synchronizing the topic and the keyword data to one or more third party applications;
   while displaying the media content item on the endpoint device, providing and displaying on the same endpoint device the one or more third party applications;
   providing via the one or more third party applications on the endpoint device information relevant to the media content item being displayed on the same endpoint device based on the received topic and keyword data identified by the caption mining engine from the caption data associated with the media content item being displayed on the same endpoint device; and
   displaying the additional information on the endpoint device, via the one or more displayed third party applications, simultaneously along with the media content item on the endpoint device such that the additional information and the media content item may be watched at the same time on the same endpoint device;
   wherein the caption data includes time code data that indicates a time and duration of spoken elements, and the additional information is provided to the user of the endpoint device by the one or more third party applications using the time code data based on a timing of the keywords being provided during playback of the media content.

7. The method of claim 6, wherein providing information relevant to the media content item based on the received keyword data comprises providing information to one or more endpoint devices.

8. The method of claim 7, wherein providing information to one or more endpoint devices includes providing information to one or more of:
   an Internet television;
   a set-top box;

a mobile computing device;
a tablet computing device; or
a computer.

9. The method of claim 6, wherein receiving keyword data extracted from media content metadata and caption data associated with a media content item comprises receiving keyword data extracted via a caption mining engine.

10. The method of claim 6, further comprising providing an action relevant to the media content item based on the received keyword data.

11. The method of claim 10, wherein providing an action relevant to the media content item based on the received keyword data comprises providing a parental control action.

12. The method of claim 11, further comprising:
receiving a selection of one or more keywords to censor; and
providing the parental control action when the one or more keywords are spoken.

13. The method of claim 6, wherein providing information relevant to the media content item based on the received keyword data comprises providing information via a web-based collaborative encyclopedia application.

14. The method of claim 6, wherein providing information relevant to the media content item based on the received keyword data comprises providing an advertisement relevant to one or more extracted keywords.

15. The method of claim 14, wherein providing an advertisement comprises providing a short message service (SMS) text to a user's mobile communication device.

16. A system for providing information based on extracted keywords from caption data, the system comprising:
a memory storage; and
a processing unit coupled to the memory storage, wherein the processing unit is operable to:
providing media content from a plurality of content providers to a user of an endpoint device;
extracting from a caption mining engine a topic and keyword data from caption data associated with a media content item being displayed;
synchronizing the topic and keyword data to one or more third party applications;
while displaying the media content item on the endpoint device, providing and displaying on the same endpoint device the one or more third party applications;
providing via the one or more third party applications on the endpoint device information relevant to the media content item being displayed on the same endpoint device based on the received topic and keyword data identified by the caption mining engine from the caption data associated with the media content item being displayed on the same endpoint device;
displaying the additional information on the same device, via the one or more displayed third party applications, simultaneously along with the media content item on the endpoint device such that the additional information and the media content item may be watched at the same time on the same endpoint device;
receiving time code data associated with the keyword data, the time code data indicating a time and duration of spoken elements; and
providing to the user of the endpoint device the additional information or an action relevant to the media content item based on the time code data including a timing of the keywords provided during playback of the media content item.

17. The system of claim 16, wherein providing information or an action relevant to the media content item based on the time code data includes providing information or an action to one or more of:
an Internet television;
a set-top box;
a mobile computing device;
a tablet computing device; or
a computer.

18. The system of claim 16, wherein the caption mining engine analyzes media content metadata including the caption data to find certain keywords selected by a user via a parental control application to censor, and
the caption mining engine provides information to the parental control application including time codes so that when certain keywords are spoken in the media content item, the parental control application provides censoring.

19. The system of claim 16, wherein the one or more third party applications include an application for providing a count of a number of times a keyword is spoken in a media content item, and wherein a keyword count may be provided to ensure a number of product placements is included in the media content item.

20. The system of claim 16, wherein the one or more third party applications include an application for determining when a user stops watching a media content item to determine certain keywords that cause users to change the media content item.

* * * * *